US011220611B2

(12) United States Patent
Nagano et al.

(10) Patent No.: US 11,220,611 B2
(45) Date of Patent: Jan. 11, 2022

(54) WATER-BASED INK FOR INK-JET RECORDING

(71) Applicant: KAO CORPORATION, Tokyo (JP)

(72) Inventors: Tomohiko Nagano, Wakayama (JP); Kaname Mitsuyoshi, Kinokawa (JP); Tsuyoshi Egawa, Izumiotsu (JP)

(73) Assignee: KAO CORPORATION, Tokyo (JP)

( * ) Notice: Subject to any disclaimer, the term of this patent is extended or adjusted under 35 U.S.C. 154(b) by 195 days.

(21) Appl. No.: 16/626,654

(22) PCT Filed: Jul. 9, 2018

(86) PCT No.: PCT/JP2018/025909
§ 371 (c)(1),
(2) Date: Dec. 26, 2019

(87) PCT Pub. No.: WO2019/013173
PCT Pub. Date: Jan. 17, 2019

(65) Prior Publication Data
US 2020/0123402 A1 Apr. 23, 2020

(30) Foreign Application Priority Data
Jul. 10, 2017 (JP) .............................. JP2017-134978

(51) Int. Cl.
C09D 11/322 (2014.01)
C08K 5/00 (2006.01)
C08K 5/053 (2006.01)
C08K 5/1515 (2006.01)
C08L 33/08 (2006.01)
C08L 33/10 (2006.01)

(52) U.S. Cl.
CPC .......... C09D 11/322 (2013.01); C08K 5/0025 (2013.01); C08K 5/0041 (2013.01); C08K 5/053 (2013.01); C08K 5/1515 (2013.01); C08L 33/08 (2013.01); C08L 33/10 (2013.01); C08L 2312/00 (2013.01)

(58) Field of Classification Search
None
See application file for complete search history.

(56) References Cited

U.S. PATENT DOCUMENTS

| 2005/0235870 | A1* | 10/2005 | Ishihara | C09D 11/38 106/31.58 |
| 2006/0047013 | A1* | 3/2006 | Ito | C09D 11/30 523/160 |
| 2006/0173096 | A1* | 8/2006 | Ota | C09D 11/326 523/161 |
| 2010/0086689 | A1* | 4/2010 | Ohta | B41M 5/0023 427/256 |
| 2010/0086692 | A1* | 4/2010 | Ohta | C09D 11/40 427/256 |
| 2011/0234682 | A1* | 9/2011 | Ohta | C09D 11/322 347/20 |
| 2012/0176455 | A1* | 7/2012 | Ohta | C09D 11/38 347/102 |
| 2012/0249705 | A1* | 10/2012 | Aoki | B41M 5/0011 347/102 |
| 2012/0252942 | A1* | 10/2012 | Aoki | C09D 11/322 524/104 |
| 2013/0053485 | A1* | 2/2013 | Misawa | C09D 11/324 524/104 |
| 2013/0208063 | A1* | 8/2013 | Okuyama | C09D 11/38 347/100 |
| 2013/0300799 | A1* | 11/2013 | Mizutani | B41J 2/16505 347/30 |
| 2014/0292911 | A1* | 10/2014 | Kajimoto | B41J 2/165 347/29 |
| 2016/0130453 | A1* | 5/2016 | Eguchi | C09D 11/322 347/20 |

(Continued)

FOREIGN PATENT DOCUMENTS

| EP | 2 182 035 A1 | 5/2010 |
| EP | 3 421 556 A1 | 1/2019 |

(Continued)

OTHER PUBLICATIONS

Google scholar search (Year: 2021).*
IP.com search (Year: 2021).*

(Continued)

Primary Examiner — Peter A Salamon
(74) Attorney, Agent, or Firm — Birch, Stewart, Kolasch & Birch, LLP

(57) ABSTRACT

The present invention relates to [1] a water-based ink for ink-jet printing which can be prevented from suffering from increased viscosity and flocculation of the ink upon storage thereof even when used in the form of a system containing a large amount of a solvent, said water-based ink for ink-jet printing containing crosslinked polymer particles containing a pigment having an indanthrone skeleton, an organic solvent and water, in which a crosslinking rate of the crosslinked polymer is not less than 10 mol % and not more than 90 mol %, and a content of the organic solvent in the water-based ink is not less than 30% by mass and not more than 65% by mass, and [2] an ink-jet printing method including the steps of loading the water-based ink as described in the above [1] to an ink-jet printing apparatus, and ejecting the water-based ink in the form of droplets of the ink onto a printing medium to form characters or images on the printing medium.

12 Claims, No Drawings

(56) References Cited

U.S. PATENT DOCUMENTS

2016/0333211 A1* 11/2016 Miyajima .............. C09D 11/30
2018/0142110 A1*  5/2018 Maeda ..................... B41J 2/01
2020/0123402 A1*  4/2020 Nagano ................ C09D 11/106

FOREIGN PATENT DOCUMENTS

| | | | |
|---|---|---|---|
| JP | 2003-94792 A | | 4/2003 |
| JP | 2005-15813 A | | 1/2005 |
| JP | 2005-120265 A | | 5/2005 |
| JP | 2005120265 A | * | 5/2005 |
| JP | 2008-156465 A | | 7/2008 |
| JP | 2009-108116 A | | 5/2009 |
| JP | 2012-116927 A | | 6/2012 |
| JP | 2012-136645 A | | 7/2012 |
| JP | 2015-13990 A | | 1/2015 |
| WO | WO 2014/196578 A1 | | 12/2014 |
| WO | WO 2016/181797 A1 | | 11/2016 |

OTHER PUBLICATIONS

International Search Report, issued in PCT/JP2018/025909, dated Oct. 2, 2018.

* cited by examiner

WATER-BASED INK FOR INK-JET RECORDING

FIELD OF THE INVENTION

The present invention relates to a water-based ink for ink-jet printing and an ink-jet printing method.

BACKGROUND OF THE INVENTION

In ink-jet printing methods, droplets of ink are directly ejected onto a printing medium from very fine nozzles and allowed to adhere to the printing medium to form characters or images thereon. The ink-jet printing methods have become rapidly spread because of various advantages such as easiness of full coloration, low cost, capability of using a plain paper as the printing medium, non-contact with printed characters or images, etc.

In recent years, in order to impart good weathering resistance and water resistance to printed materials, an ink for ink-jet printing which contains a pigment as a colorant has been extensively used. As the pigment, there have been used those pigments having process colors, i.e., a yellow pigment, a magenta pigment, a cyan pigment and a black pigment. Upon production of the ink using the pigments having process colors, in order to enhance storage stability of the ink, there has been employed such a method in which a polymer dispersant used for dispersing the pigments is subjected to crosslinking reaction, or the like.

For example, JP2008-156465A (Patent Literature 1) discloses a water-based ink for ink-jet printing as an ink using a crosslinked polymer, which contains crosslinked polymer particles containing C.I. Pigment Yellow 74 and a polar group-containing pigment derivative, in which the crosslinked polymer particles are obtained by crosslinking a polymer with a compound containing two or more reactive functional groups in a molecule thereof.

In addition, in recent years, in order to expand a reproducible region of various colors, there have been used pigments having special colors such as red, green, blue, orange, violet, etc.

For example, JP2005-15813A (Patent Literature 2) discloses an ink set for ink-jet printing which contains a cyan ink composition containing at least one pigment selected from the group consisting of C.I. Pigment Blue 60, C.I. Pigment Blue 22, C.I. Pigment Blue 64 and C.I. Pigment Blue 21.

Moreover, JP2003-94792A (Patent Literature 3) discloses an ink-jet printing method for printing images, etc., on a printing medium using pigment inks containing a yellow pigment, a magenta pigment and a cyan pigment, respectively, in which the printing medium has a specific gloss, a specific surface roughness and a specific penetration rate, and at least one of the pigment inks contains pigment particles having a specific zeta potential. In Examples of Patent Literature 3, it is described that the ink set prepared by dispersing C.I. Pigment Blue 60 with an acrylic-styrene-based resin was used.

SUMMARY OF THE INVENTION

The present invention relates to a water-based ink for ink-jet printing containing crosslinked polymer particles containing a pigment having an indanthrone skeleton, an organic solvent and water, in which a crosslinking rate of the crosslinked polymer is not less than 10 mol % and not more than 90 mol %, and a content of the organic solvent in the water-based ink is not less than 30% by mass and not more than 65% by mass; and an ink-jet printing method.

DETAILED DESCRIPTION OF THE INVENTION

As a result of evaluating various color inks prepared in the form of a system containing a large amount of a solvent, the present inventors have found that when using a pigment having an indanthrone skeleton, such as C.I. Pigment Blue 60, and a polymer dispersant in the inks, there is such a tendency that the inks suffer from increased viscosity or flocculation upon storage thereof when used in the form of the system containing a large amount of a solvent.

However, in the ink described in Patent Literature 1, no specific color pigments such as C.I. Pigment Blue 60 are used therein. Therefore, Patent Literature 1 has failed to raise problems occurring upon use of the specific color pigments.

In the inks described in Patent Literatures 2 and 3, the polymers used in the inks are not in the form of a crosslinked polymer. In addition, although the images obtained using the inks are evaluated with respect to light fastness, image quality, etc., no studies on storage stability, etc., of the inks have been made therein. Thus, no concrete studies concerning storage stability of the specific color inks for ink-jet printing when used in the form of a system containing a large amount of a solvent have been made conventionally.

The present invention relates to an ink for ink-jet printing which contains a pigment having an indanthrone skeleton, and can be prevented from suffering from increased viscosity or flocculation of the ink even when used in the form of a system containing a large amount of a solvent, and an ink-jet printing method.

The present inventors have found that the aforementioned conventional problems can be solved by using pigment-containing crosslinked polymer particles in a water-based ink that contains a pigment having an indanthrone skeleton and a large amount of a solvent.

That is, the present invention relates to the following aspects [1] and [2]. [1] A water-based ink for ink-jet printing containing crosslinked polymer particles containing a pigment having an indanthrone skeleton, an organic solvent and water, in which a crosslinking rate of the crosslinked polymer is not less than 10 mol % and not more than 90 mol %, and a content of the organic solvent in the water-based ink is not less than 30% by mass and not more than 65% by mass.

[2] An ink-jet printing method including the steps of loading the water-based ink according to the above aspect [1] to an ink-jet printing apparatus, and ejecting the water-based ink in the form of droplets of the ink onto a printing medium to form characters or images on the printing medium.

In accordance with the present invention, it is possible to provide an ink for ink-jet printing which contains a pigment having an indanthrone skeleton, and can be prevented from suffering from increased viscosity or flocculation of the ink even when used in the form of a system containing a large amount of a solvent, as well as an ink-jet printing method.

[Water-Based Ink for Ink-Jet Printing]

The water-based ink for ink-jet printing according to the present invention contains crosslinked polymer particles containing a pigment having an indanthrone skeleton, an organic solvent and water, in which a crosslinking rate of the crosslinked polymer is not less than 10 mol % and not more than 90 mol %, and a content of the organic solvent in the water-based ink is not less than 30% by mass and not more than 65% by mass.

The water-based ink for ink-jet printing according to the present invention has the effect of suppressing increased viscosity and flocculation of the ink which tend to be specifically caused upon storage of the ink when using the pigment having an indanthrone skeleton and the polymer dispersant therein. The reason why the aforementioned advantageous effect can be attained by the present invention is considered as follows, though it is not clearly determined yet.

That is, the adsorption of the polymer dispersant onto pigments may vary even though the same kind of polymer is used as the polymer dispersant, since the pigments are different in affinity to a solvent (solubility parameter: sp value), specific surface area, etc., from each other according to species of the pigments. The pigment having an indanthrone skeleton such as typically C.I. Pigment Blue 60 tends to be deteriorated in adsorption of a polymer thereonto in water as compared to the other pigments. The reason therefor is considered to be that the pigment having an indanthrone skeleton tends to have a low affinity to the polymer or tends to have a small surface area onto which the polymer can be adsorbed as compared to generally used pigments, so that it becomes difficult to adsorb the polymer dispersant onto the pigment.

The pigment having an indanthrone skeleton tends to be barely dispersed in water by a repulsion force of the polymer dispersant adsorbed onto the pigment. However, if a solvent is added to the ink, the hydrophobic polymer dispersant is likely to be dissolved in the solvent. For this reason, it is considered that desorption of the polymer from the surface of the pigment is accelerated, so that the ink is no longer maintained in a stable dispersed state and tends to be suffer from increased viscosity and flocculation.

In this case, it is considered that by using a polymer obtained by crosslinking molecules of the polymer dispersant adsorbed onto the pigment with each other at a crosslinking rate of not less than 10 mol %, it is possible to prevent desorption of the polymer from the surface of the pigment even in the case where a large amount of a solvent is added to the ink, and therefore suppress increased viscosity and flocculation of the ink.

The "polymer dispersant" as used herein means a polymer before being crosslinked, the "crosslinked polymer" as used herein means a polymer obtained by crosslinking the polymer dispersant, and the "pigment-containing crosslinked polymer particles" as used herein mean particles containing the pigment and the crosslinked polymer which are obtained by crosslinking the polymer dispersant adsorbed onto the surface of the pigment with a crosslinking agent.

<Water-Based Ink for Ink-Jet Printing>

The water-based ink for ink-jet printing according to the present invention (hereinafter also referred to merely as a "water-based ink") contains crosslinked polymer particles containing a pigment having an indanthrone skeleton (hereinafter also referred to as "pigment-containing crosslinked polymer particles"), an organic solvent and water.

The method for producing the water-based ink of the present invention is not particularly limited. However, the water-based ink of the present invention is preferably produced by the method of mixing a water dispersion of the crosslinked polymer particles containing the pigment having an indanthrone skeleton, water and the organic solvent, if required together with a surfactant, etc., by conventionally known methods, and then adjusting a content of the organic solvent in the resulting mixture to a range of not less than 30% by mass and not more than 65% by mass.

Meanwhile, the term "water-based" as used herein means that water has a largest content among components of a dispersing medium contained in the ink.

<Pigment Having Indanthrone Skeleton>

In the water-based ink of the present invention, the pigment having an indanthrone skeleton (hereinafter also referred to merely as a "pigment") is used as a colorant therefor.

The indanthrone is present in the form of four kinds of compounds including α-type indanthrone, β-type indanthrone, γ-type indanthrone and δ-type indanthrone which exhibit a blue tinted color having a color tone ranging from green to red according to the type thereof. Among these indanthrone compounds, the α-type indanthrone is most stable. The α-type indanthrone pigment is useful as a beautiful reddish blue pigment that can exhibit a highly weather-resistant reddish blue color tone so as to meet high performance requirements which can be never achieved by copper phthalocyanine pigments.

The pigment having an indanthrone skeleton used in the present invention is preferably in the form of a compound represented by the following formula (1).

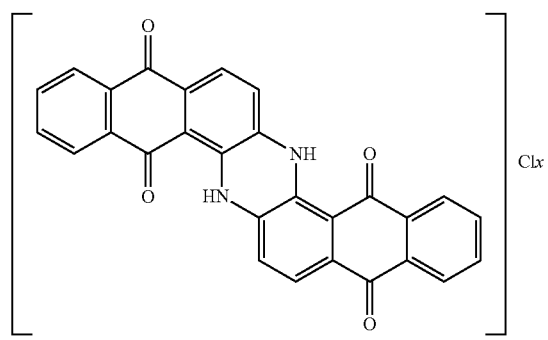

wherein Cl represents a chlorine atom that is substituted for any of hydrogen atoms being present in a structure of the compound; and x is the number of chlorine atoms substituted, and represents an integer of 0 to 3.

As the compound represented by the aforementioned formula (1), preferred is at least one compound selected from the group consisting of C.I. Pigment Blue 60 (compound of the aforementioned formula (1) wherein x is 0), C.I. Pigment Blue 22 (compound of the aforementioned formula (1) wherein x is 1), C.I. Pigment Blue 64 (compound of the aforementioned formula (1) wherein x is 2) and C.I. Pigment Blue 21 (compound of the aforementioned formula (1) wherein x is 3), etc., and more preferred is C.I. Pigment Blue 60.

In the present invention, the pigment having an indanthrone skeleton may be used in combination with the other organic pigment or an extender pigment, if required.

The pigment having an indanthrone skeleton is contained in the water-based ink in the form of pigment-containing crosslinked polymer particles.

<Pigment-Containing Crosslinked Polymer Particles>

The polymer dispersant constituting the crosslinked polymer particles containing the pigment having an indanthrone skeleton (pigment-containing crosslinked polymer particles) is crosslinked with a crosslinking agent to form a crosslinked polymer.

The polymer constituting the crosslinked polymer particles is preferably in the form of a water-insoluble polymer.

The term "water-insoluble" of the water-insoluble polymer as used herein means that when a polymer is dried to a constant weight at 105° C. for 2 hours and then dissolved in 100 g of water at 25° C. until reaching a saturation concentration thereof, the solubility in water of the polymer is not more than 10 g. The solubility in water of the water-insoluble polymer is preferably not more than 5 g and more preferably not more than 1 g. In the case where the polymer is in the form of an anionic polymer, the solubility means a solubility in water of the polymer whose anionic groups are neutralized completely (i.e., 100%) with sodium hydroxide. On the other hand, in the case where the polymer is in the form of a cationic polymer, the solubility means a solubility in water of the polymer whose cationic groups are neutralized completely (i.e., 100%) with hydrochloric acid.

The configuration of the pigment-containing crosslinked polymer particles is not particularly limited, and the polymer particles may have any configuration as long as the particles are formed of at least the pigment and the polymer. Examples of the configuration of the pigment-containing crosslinked polymer particles include the particle configuration in which the pigment is enclosed or encapsulated in the polymer, the particle configuration in which the pigment is uniformly dispersed in the polymer, the particle configuration in which the pigment is exposed onto a surface of the respective polymer particles, as well as a mixed configuration of these particle configurations. Among these configurations of the pigment-containing crosslinked polymer particles, preferred is the particle configuration in which the pigment is enclosed or encapsulated in the polymer.

As the polymer dispersant before being crosslinked which constitutes the pigment-containing crosslinked polymer particles, there may be mentioned condensation-based resins such as polyesters and polyurethanes, vinyl-based polymers and the like. Among these polymers, from the viewpoint of suppressing increased viscosity and flocculation of the water-based ink as well as from the viewpoint of improving storage stability of the ink, preferred are vinyl-based polymers obtained by addition-polymerizing a vinyl monomer (such as a vinyl compound, a vinylidene compound and a vinylene compound). Examples of the vinyl-based polymers include acrylic polymers containing a constitutional unit derived from acrylic acid and/or a constitutional unit derived from methacrylic acid. The vinyl-based polymers used in the present invention may be either an appropriately synthesized product or a commercially available product. The polymer before being crosslinked may be used in the form of either a water-soluble polymer or a water-insoluble polymer.

In the case where the polymer dispersant as the polymer before being crosslinked is in the form of a vinyl-based polymer, the vinyl-based polymer preferably contains one or more constitutional units selected from the group consisting of a constitutional unit derived from (a) an ionic monomer, a constitutional unit derived from (b) a hydrophobic monomer and a constitutional unit derived from (c) a hydrophilic nonionic monomer, more preferably two or more constitutional units selected from the group consisting of the aforementioned three constitutional units, and even more preferably all of the aforementioned three constitutional units. Examples of the combination of the aforementioned monomers from which the constitutional units of the vinyl-based polymer are derived include a combination of the ionic monomer (a) and the hydrophobic monomer (b), and a combination of the ionic monomer (a), the hydrophobic monomer (b) and the hydrophilic nonionic monomer (c).

The vinyl-based polymer is preferably in the form of a highly hydrophilic polymer. The "highly hydrophilic polymer" as used herein means a polymer having an acid value of not less than 150 mgKOH/g and preferably not less than 200 mgKOH/g.

The vinyl-based polymer may be produced, for example, by addition-polymerizing a monomer mixture containing the ionic monomer (a), the hydrophobic monomer (b) and the hydrophilic nonionic monomer (c) by conventionally known methods.

(a) Ionic Monomer

The ionic monomer (a) is preferably used as a monomer component of the polymer from the viewpoint of improving dispersion stability of the pigment-containing crosslinked polymer particles in the water-based ink. Examples of the ionic monomer (a) include an anionic monomer and a cationic monomer. Among these ionic monomers, preferred is an anionic monomer.

Examples of the anionic monomer include a carboxylic acid monomer, a sulfonic acid monomer and a phosphoric acid monomer, etc.

Among these anionic monomers, from the viewpoint of improving dispersion stability of the pigment-containing crosslinked polymer particles in the water-based ink, preferred is a carboxy group-containing carboxylic acid monomer, more preferred are acrylic acid, methacrylic acid, crotonic acid, itaconic acid, maleic acid, fumaric acid, citraconic acid, 2-methacryloyloxymethylsuccinic acid and the like, and even more preferred is at least one compound selected from the group consisting of acrylic acid and methacrylic acid.

Examples of the cationic monomer include N,N-dimethylaminoethyl methacrylate, N,N-dimethylaminoethyl acrylamide and the like.

Meanwhile, the ionic monomer (a) may also include those monomers that have no ionicity under neutral conditions, but are converted into ions under acid or alkaline conditions, such as acids and amines.

(b) Hydrophobic Monomer

The hydrophobic monomer (b) is preferably used as a monomer component of the polymer from the viewpoint of improving dispersion stability of the pigment-containing crosslinked polymer particles in the water-based ink. Examples of the hydrophobic monomer include an alkyl (meth)acrylate, an aromatic group-containing monomer and the like.

As the alkyl (meth)acrylate, preferred are those alkyl (meth)acrylates containing an alkyl group having 1 to 22 carbon atoms and preferably 6 to 18 carbon atoms. Examples of the alkyl (meth)acrylate include methyl (meth)acrylate, ethyl (meth)acrylate, (iso)propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate and the like.

Meanwhile, the terms "(iso- or tertiary)" and "(iso)" as used herein mean both the structure in which any of the groups expressed by "iso- or tertiary-" and "iso" are present, and the structure in which none of these groups are present (i.e., normal). In addition, the term "(meth)acrylate" as used herein means an acrylate and/or a methacrylate.

The aromatic group-containing monomer is preferably a vinyl monomer containing an aromatic group having 6 to 22 carbon atoms which may also contain a substituent group containing a hetero atom, and more preferably a styrene-based monomer, an aromatic group-containing (meth)acrylate or a styrene-based macromonomer.

As the styrene-based monomer, preferred are styrene, 2-methyl styrene and divinyl benzene, and more preferred is styrene.

Also, as the aromatic group-containing (meth)acrylate, preferred are benzyl (meth)acrylate, phenoxyethyl (meth)acrylate and the like, and more preferred is benzyl (meth)acrylate.

The styrene-based macromonomer is in the form of a compound containing a polymerizable functional group at one terminal end thereof and having a number-average molecular weight of preferably not less than 500 and more preferably not less than 1,000, and also preferably not more than 100,000 and more preferably not more than 10,000. As the polymerizable functional group, preferred is an acryloyloxy group or a methacryloyloxy group, and more preferred is a methacryloyloxy group.

Specific examples of the styrene-based macromonomer include "AS-6(S)", "AN-6(S)" and "HS-6(S)" (tradenames) all available from Toagosei Co., Ltd., etc.

(c) Hydrophilic Nonionic Monomer

The hydrophilic nonionic monomer (c) is preferably used as a monomer component of the polymer from the viewpoint of improving dispersion stability of the pigment-containing crosslinked polymer particles in the water-based ink as well as from the viewpoint of suppressing increased viscosity and flocculation of the water-based ink.

Specific examples of the hydrophilic nonionic monomer (c) include 2-hydroxyethyl (meth)acrylate, 3-hydroxypropyl (meth)acrylate, polyalkylene glycol mono(meth)acrylates such as polypropylene glycol (n=2 to 30 wherein n represents an average molar number of addition of oxyalkylene groups: hereinafter defined in the same way) (meth)acrylate and polyethylene glycol (n=2 to 30) (meth)acrylate, alkoxy polyalkylene glycol (meth)acrylates such as methoxy polyethylene glycol (n=1 to 30) (meth)acrylate and octoxy polyethylene glycol (n=1 to 30) (meth)acrylate, phenoxy (ethylene glycol/propylene glycol copolymer) (n=1 to 30 in which n for ethylene glycol: n=1 to 29) (meth)acrylate, etc.

Specific examples of commercially available products of the hydrophilic nonionic monomer (c) include "NK ESTER M-20G", "NK ESTER M-40G", "NK ESTER M-90G", "NK ESTER M-230G" and the like all available from Shin-Nakamura Chemical Co., Ltd.; "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like all available from NOF Corporation; etc.

The aforementioned ionic monomers (a), hydrophobic monomers (b) and hydrophilic nonionic monomers (c) may be respectively used alone or in the from of a mixture of any two or more thereof.

The polymer used in the present invention may also contain constitutional units derived from monomers other than the aforementioned monomers unless the objects and advantageous effects of the present invention are adversely affected by inclusion thereof.

(Contents of Respective Components in Monomer Mixture or Contents of Respective Constitutional Units in Polymer)

The contents of the aforementioned respective components in the monomer mixture as used upon production of the polymer dispersant (contents of non-neutralized components; hereinafter defined in the same way), or the contents of the constitutional units derived from the aforementioned respective components in the polymer dispersant are as follows from the viewpoint of improving dispersion stability of the pigment-containing crosslinked polymer particles in the water-based ink.

Meanwhile, the contents of the constitutional units in the polymer dispersant are identical to contents of the constitutional units in the polymer constituting the crosslinked polymer particles.

The content of the ionic monomer (a) is preferably not less than 3% by mass, more preferably not less than 5% by mass and even more preferably not less than 8% by mass, and is also preferably not more than 60% by mass, more preferably not more than 50% by mass and even more preferably not more than 40% by mass.

The content of the hydrophobic monomer (b) is preferably not less than 20% by mass, more preferably not less than 40% by mass and even more preferably not less than 50% by mass, and is also preferably not more than 90% by mass, more preferably not more than 80% by mass and even more preferably not more than 75% by mass.

In the case where the hydrophilic nonionic monomer (c) is included, the content of the hydrophilic nonionic monomer (c) is preferably not less than 5% by mass, more preferably not less than 10% by mass and even more preferably not less than 20% by mass, and is also preferably not more than 60% by mass, more preferably not more than 55% by mass and even more preferably not more than 50% by mass.

Also, in the case where the macromonomer is included as the component (b), the content of the macromonomer is preferably not less than 5% by mass, more preferably not less than 8% by mass and even more preferably not less than 10% by mass, and is also preferably not more than 50% by mass, more preferably not more than 40% by mass and even more preferably not more than 30% by mass.

In addition, the mass ratio of the ionic monomer (a) to the hydrophobic monomer (b) including the macromonomer [ionic monomer (a)/hydrophobic monomer (b)] is preferably not less than 0.01, more preferably not less than 0.05 and even more preferably not less than 0.10, and is also preferably not more than 1, more preferably not more than 0.60 and even more preferably not more than 0.50.

(Production of Polymer Dispersant)

The aforementioned polymer dispersant may be produced by copolymerizing the aforementioned monomer mixture by a conventionally known polymerization method. As the polymerization method, preferred is a solution polymerization method.

The organic solvent used in the solution polymerization method is not particularly limited, and is preferably an organic polar solvent such as aliphatic alcohols having 1 to 3 carbon atoms, ketones having 3 to 8 carbon atoms, ethers and esters. Specific examples of the preferred organic polar solvent include methanol, ethanol, acetone and methyl ethyl ketone. Among these organic polar solvents, more preferred is methyl ethyl ketone.

The polymerization may be carried out in the presence of a polymerization initiator or a chain transfer agent. As the polymerization initiator, preferred is an azo compound, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kind of polymerization initiator used, etc. However, the polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or in an atmosphere of an inert gas such as argon.

After completion of the polymerization reaction, the polymer produced may be isolated from the obtained reaction solution by conventionally known methods such as reprecipitation and removal of the solvent by distillation. In addition, the resulting polymer may be subjected to reprecipitation, membrane separation, chromatography, extraction, etc., to remove unreacted monomers, etc., from the reaction solution.

From the viewpoint of enhancing productivity of the below-mentioned water dispersion of the pigment-containing crosslinked polymer particles, the obtained polymer dispersant is preferably used as such in the form of a polymer solution without removing the solvent used in the aforementioned polymerization reaction therefrom.

The solid content of the polymer solution is preferably not less than 30% by mass and more preferably not less than 40% by mass, and is also preferably not more than 70% by mass and more preferably not more than 65% by mass, from the viewpoint of enhancing productivity of the water dispersion of the pigment-containing crosslinked polymer particles.

The weight-average molecular weight of the polymer before being crosslinked (polymer dispersant) is preferably not less than 8,000, more preferably not less than 10,000, even more preferably not more than 11,000 and further even more preferably not more than 12,000, and is also preferably not more than 500,000, more preferably not more than 400,000, even more preferably not more than 300,000, further even more preferably not more than 200,000, still further even more preferably not more than 100,000 and furthermore preferably not more than 50,000, from the viewpoint of improving dispersion stability of the pigment-containing crosslinked polymer particles in the water-based ink.

Meanwhile, the weight-average molecular weight of the polymer may be measured by the method described in Examples below.

Specific examples of commercially available products of the vinyl-based polymers include polyacrylic acids such as "ARON AC-10SL" available from Toagosei Co., Ltd., and styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.

<Production of Pigment-Containing Crosslinked Polymer Particles>

The water-based ink for ink-jet printing according to the present invention contains the crosslinked polymer particles containing the pigment (pigment-containing crosslinked polymer particles).

The pigment-containing crosslinked polymer particles may be efficiently produced in the form of a pigment water dispersion thereof by the process including the following steps I and II.

Step I: subjecting a mixture containing a solution of the polymer before being crosslinked, the pigment and water (hereinafter also referred to merely as a "pigment mixture") to dispersion treatment to obtain an aqueous dispersion liquid of polymer particles containing the pigment (hereinafter also referred to merely as "pigment-containing polymer particles") (such a dispersion liquid is hereinafter also referred to merely as an "aqueous pigment dispersion liquid"); and Step II: mixing the aqueous dispersion liquid obtained in the step I with a crosslinking agent to subject the polymer to crosslinking treatment, thereby obtaining a pigment water dispersion.

(Step I)

In the step I, it is preferred that the solution of the polymer before being crosslinked, the pigment and water are first mixed, if required together with a neutralizing agent, a surfactant and the like, to obtain a dispersion liquid of an oil-in-water type. The order of addition of the components to be added to the solution of the polymer before being crosslinked is not particularly limited, and it is preferred that water, the neutralizing agent and the pigment are successively added in this order.

In the case where the polymer before being crosslinked is synthesized by a solution polymerization method, the solvent used in the solution polymerization method may be used as such in the step I.

(Neutralization)

In the case where the polymer before being crosslinked as used in the present invention is in the form of an anionic polymer, a neutralizing agent may be used to neutralize anionic groups in the polymer before being crosslinked. When using the neutralizing agent, the polymer is preferably neutralized therewith such that the pH value of the resulting polymer solution is controlled to not less than 7 and not more than 11. In addition, if the polymer before being crosslinked is converted into a water-soluble state by the neutralization, from the viewpoint of efficiently obtaining the aqueous dispersion liquid of the pigment-containing polymer particles, it is preferred that the amount of the neutralizing agent used is controlled to conduct the step I under the condition that the polymer before being crosslinked is kept in a water-insoluble state.

Examples of the neutralizing agent include hydroxides of alkali metals, ammonia and organic amines. Specific examples of the hydroxides of alkali metals include lithium hydroxide, sodium hydroxide, potassium hydroxide, cesium hydroxide, etc. Among these hydroxides of alkali metals, preferred is sodium hydroxide. Specific examples of the organic amines include trimethylamine, ethylamine, diethylamine, triethylamine, triethanolamine, etc.

As the neutralizing agent, from the viewpoint of improving ejection stability and storage stability of the water-based ink, preferred are the hydroxides of alkali metals and ammonia, and more preferred is a combination of sodium hydroxide and ammonia. In addition, the polymer may be previously neutralized.

The neutralizing agent is preferably used in the form of an aqueous neutralizing agent solution from the viewpoint of sufficiently and uniformly accelerating the neutralization. From the same viewpoint as described above, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The degree of neutralization of the anionic groups of the polymer is preferably not less than 30 mol %, more preferably not less than 40 mol % and even more preferably not less than 50 mol %, and is also preferably not more than 300 mol %, more preferably not more than 200 mol % and even more preferably not more than 150 mol %, from the viewpoint of improving dispersion stability of the pigment-containing crosslinked polymer particles in the water-based ink.

The degree of neutralization as used herein means the value calculated by dividing a mole equivalent of the neutralizing agent by a molar amount of the anionic groups of the polymer.

(Contents of Respective Components in Pigment Mixture)

The content of the pigment in the pigment mixture in the step I is preferably not less than 10% by mass, more preferably not less than 12% by mass and even more preferably not less than 14% by mass, and is also preferably not more than 30% by mass, more preferably not more than 25% by mass and even more preferably not more than 20% by mass, from the viewpoint of improving dispersion stability of the pigment-containing crosslinked polymer particles in the water-based ink as well as from the viewpoint of enhancing productivity of the pigment water dispersion.

The content of the polymer before being crosslinked (polymer dispersant) in the pigment mixture is preferably not less than 2.0% by mass, more preferably not less than 4.0% by mass and even more preferably not less than 5.0% by mass, and is also preferably not more than 15% by mass, more preferably not more than 12% by mass and even more preferably not more than 10% by mass, from the viewpoint of improving dispersion stability of the pigment-containing crosslinked polymer particles in the water-based ink.

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass, from the viewpoint of improving dispersion stability of the pigment-containing crosslinked polymer particles in the water-based ink as well as from the viewpoint of enhancing productivity of the pigment water dispersion.

The mass ratio of the pigment to the polymer before being crosslinked [pigment/polymer before being crosslinked] in the pigment mixture is preferably not less than 30/70, more preferably not less than 40/60, even more preferably not less than 50/50 and further even more preferably not less than 60/40, and is also preferably not more than 90/10, more preferably not more than 80/20 and even more preferably not more than 75/25, from the viewpoint of improving dispersion stability of the pigment-containing crosslinked polymer particles in the water-based ink.

(Dispersion Treatment of Pigment Mixture)

In the step I, the aforementioned pigment mixture is subjected to dispersion treatment to obtain the aqueous dispersion liquid of the pigment-containing polymer particles. The dispersing method for obtaining the aforementioned aqueous dispersion liquid is not particularly limited. The pigment particles may be atomized into fine particles having a desired average particle size only by subjecting the pigment mixture to substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment particles to a desired value.

The temperature used in the preliminary dispersion treatment in the step I is preferably not lower than 0° C., and is also preferably not higher than 40° C., more preferably not higher than 30° C. and even more preferably not higher than 20° C. The dispersing time is preferably not less than 0.5 hour and more preferably not less than 1 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICRO-FLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure or the number of passes through the homogenizer.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

In addition, the number of passes through the homogenizer used in the substantial dispersion treatment is preferably not less than 3 and more preferably not less than 10, and is also preferably not more than 30 and more preferably not more than 25.

The aqueous dispersion liquid obtained in the step I is formed by dispersing the pigment-containing polymer particles in the dispersing medium containing water as a main medium.

(Step II)

The step II is the step of mixing the aqueous dispersion liquid obtained in the step I with a crosslinking agent to subject the aqueous dispersion liquid to crosslinking treatment, thereby obtaining a pigment water dispersion. By conducting the step II, the polymer particles containing the pigment (pigment-containing polymer particles) are formed into the crosslinked polymer particles containing the pigment (pigment-containing crosslinked polymer particles).

(Crosslinking Agent)

In the case where the polymer dispersant before being crosslinked is in the form of an anionic polymer containing an anionic group such as a carboxy group, the crosslinking agent used in the step II is preferably in the form of a compound containing a functional group that is capable of reacting with the anionic group, and more preferably a compound containing the two or more functional groups and preferably the 2 to 6 functional groups in a molecule thereof.

Examples of the suitable crosslinking agent include at least one compound selected from the group consisting of a compound containing two or more epoxy groups in a molecule thereof, a compound containing two or more oxazoline groups in a molecule thereof and a compound containing two or more isocyanate groups in a molecule thereof.

The solubility in water of the crosslinking agent as measured by dissolving the crosslinking agent in 100 g of ion-exchanged water at 25° C. is preferably not more than 50 g, more preferably not more than 40 g and even more preferably not more than 30 g from the viewpoint of efficiently subjecting the polymer dispersant to surface crosslinking reaction.

Specific examples of the crosslinking agent include the following compounds (i) to (iii).

(i) Compound containing two or more epoxy groups in a molecule thereof;

Example of the compound (i) include polyglycidyl ethers such as ethylene glycol diglycidyl ether, polyethylene glycol diglycidyl ether, polypropylene glycol diglycidyl ether, glycerin triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ethers.

(ii) Compound containing two or more oxazoline groups in a molecule thereof.

Examples of the compound (ii) include compounds containing an aliphatic group or an aromatic group to which not less than 2 oxazoline groups, preferably 2 to 3 oxazoline groups are bonded. Specific examples of the compound (ii) include bisoxazoline compounds such as 2,2'-bis(2-oxazoline), 1,3-phenylene bisoxazoline and 1,3-benzobisoxazoline.

(iii) Compound containing two or more isocyanate groups in a molecule thereof;

Examples of the compound (iii) include organic polyisocyanates and isocyanate group-terminated prepolymers.

Specific examples of the organic polyisocyanates include aliphatic diisocyanates such as hexamethylene diisocyanate and 2,2,4-trimethylhexamethylene diisocyanate; aromatic diisocyanates such as tolylene-2,4-diisocyanate and phenylene diisocyanate; alicyclic diisocyanates; aromatic triisocyanates; and modified products of these organic polyisocyanates such as urethane-modified organic polyisocyanates.

Among these crosslinking agents, preferred is the compound (i) containing two or more epoxy groups in a molecule thereof, and more preferred is trimethylolpropane polyglycidyl ether.

The crosslinking rate (mol %) of the crosslinked polymer as calculated according to the following calculation formula (1) is not less than 10 mol % and not more than 90 mol %. The crosslinking rate of the crosslinked polymer is preferably not less than 15 mol % and more preferably not less than 20 mol %, and is also preferably not more than 80 mol % and more preferably not more than 75 mol %. The amount of the crosslinking agent used may be controlled such that the crosslinking rate of the crosslinked polymer falls within the aforementioned range.

Crosslinking rate (mol %)=[(number of moles of reactive groups in crosslinking agent)/(number of moles of reactive groups in polymer dispersant which are capable of reacting with crosslinking agent)]×100    (1)

In the calculation formula (1), the "number of moles of reactive groups in crosslinking agent" is the value obtained by multiplying the number of moles of the crosslinking agent used by the number of the reactive groups contained in a molecule of the crosslinking agent. The "number of moles of reactive groups in polymer dispersant which are capable of reacting with crosslinking agent" can be calculated from an acid value of the polymer dispersant. The crosslinking rate of 0% indicates such a condition that the polymer dispersant remains in an uncrosslinked state, whereas the crosslinking rate of 100% indicates such a condition that all of the reactive groups in the polymer which are capable of reacting with the crosslinking agent are subjected to crosslinking reaction.

The crosslinking reaction is preferably conducted at a temperature of 60 to 95° C. for 0.5 to 7 hours.

The acid value of the resulting crosslinked polymer is preferably not less than 40 mgKOH/g, more preferably not less than 50 mgKOH/g, even more preferably not less than 60 mgKOH/g, further even more preferably not less than 70 mgKOH/g and still further even more preferably not less than 80 mgKOH/g, and is also preferably not more than 160 mgKOH/g, more preferably not more than 150 mgKOH/g, even more preferably not more than 145 mgKOH/g and further even more preferably not more than 120 mgKOH/g, from the viewpoint of improving dispersion stability of the pigment-containing crosslinked polymer particles in the water-based ink.

The acid value of the crosslinked polymer may be measured by the method described in Examples below, and may also be calculated from a mass ratio of the monomers constituting the crosslinked polymer.

The solid content of the resulting pigment water dispersion (a concentration of non-volatile components in the pigment water dispersion) is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating preparation of the water-based ink.

Meanwhile, the solid content of the pigment water dispersion may be measured by the method described in Examples below.

The average particle size of the pigment-containing crosslinked polymer particles in the pigment water dispersion is preferably not less than 40 nm, more preferably not less than 60 nm, even more preferably not less than 80 nm and further even more preferably not less than 90 nm, and is also preferably not more than 150 nm, more preferably not more than 140 nm, even more preferably not more than 130 nm and further even more preferably not more than 120 nm, from the viewpoint of suppressing formation of coarse particles and improving ejection stability of the resulting water-based ink.

Meanwhile, the average particle size of the pigment-containing crosslinked polymer particles may be measured by the method described in Examples below.

In addition, the average particle size of the pigment-containing crosslinked polymer particles in the water-based ink is the same as the average particle size of the particles in pigment water dispersion, and the preferred ranges of the average particle size of the pigment-containing crosslinked polymer particles in the water-based ink are also the same as those of the average particle size of the particles in pigment water dispersion.

<Organic Solvent>

The water-based ink of the present invention contains an organic solvent from the viewpoint of improving ejection stability of the ink upon ink-jet printing. From the same viewpoint as described above, the boiling point of the organic solvent is preferably not lower than 90° C., more preferably not lower than 130° C., even more preferably not lower than 140° C. and further even more preferably not lower than 150° C., and is also preferably not higher than 245° C., more preferably not higher than 240° C. and even more preferably not higher than 235° C.

As the aforementioned organic solvent, there are preferably used polyhydric alcohols, etc.

(Polyhydric Alcohols)

Examples of the preferred polyhydric alcohols include a compound formed by bonding two or more hydroxy groups to a hydrocarbon having not less than 2 and not more than 6 carbon atoms, and a compound formed by condensing the two or more hydroxy groups bonded to the hydrocarbon, with each other.

Specific examples of the polyhydric alcohols include 1,2-alkanediols such as ethylene glycol, propylene glycol, 1,2-butanediol, 1,2-pentanediol and 1,2-hexanediol, diethylene glycol, polyethylene glycol, dipropylene glycol, 1,3-propanediol, 1,3-butanediol, 1,4-butanediol, 3-methyl-1,3-butanediol, 1,5-pentanediol, 2-methyl-2,4-pentanediol, 1,2,6-hexanetriol, 1,2,4-butanetriol, 1,2,3-butanetriol, petriol, etc.

Among these polyhydric alcohols, from the viewpoint of improving storage stability and ejection stability of the water-based ink, preferred is at least one compound selected from the group consisting of alkanediols having not less than 2 and not more than 6 carbon atoms such as propylene glycol, diethylene glycol and 1,2 hexanediol, and polypropylene glycols having a molecular weight of not less than 500 and not more than 1000; more preferred is at least one compound selected from the group consisting of 1,2-alkanediols having not less than 3 and not more than 4 carbon atoms such as propylene glycol (boiling point (b.p.) 188° C.) and diethylene glycol (b.p. 245° C.), and the aforementioned polypropylene glycols; and even more preferred is propylene glycol.

(Other Organic Solvents)

The organic solvent used in the water-based ink of the present invention may also contain, in addition to the aforementioned polyhydric alcohols, those organic solvents that may be usually compounded in the water-based ink, such as the other alcohols, alkyl ethers of the alcohols, glycol ethers, nitrogen-containing heterocyclic compounds such as N-methyl-2-pyrrolidone (b.p. 251° C.) and 2-pyrrolidone (b.p. 245° C.), amides, amines and sulfur-containing compounds.

Specific examples of the glycol ether include alkylene glycol monoalkyl ethers, alkylene glycol dialkyl ethers, etc. Among these glycol ethers, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

More specifically, as the alkylene glycol monoalkyl ethers, preferred is at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether, and more preferred is at least one compound selected from the group consisting of diethylene glycol methyl ether (b.p. 194° C.), diethylene glycol isopropyl ether and diethylene glycol isobutyl ether.

In addition, 1,6-hexanediol (b.p. 250° C.), triethylene glycol (b.p. 285° C.), tripropylene glycol (b.p. 273° C.), polypropylene glycol (b.p. not lower than 250° C.) and glycerin (b.p. 290° C.), etc., may be used in combination with the aforementioned compound having a boiling point of lower than 250° C.

<Production of Water-Based Ink for Ink-Jet Printing>

The method of producing the water-based ink for ink-jet printing according to the present invention is not particularly limited as long as the resulting water-based ink contains the crosslinked polymer particles containing the pigment having an indanthrone skeleton, the organic solvent and water. However, there is preferably used the method in which the water dispersion of the crosslinked polymer particles containing the pigment having an indanthrone skeleton, water and the organic solvent are mixed with each other by conventionally known methods to control a content of the organic solvent in the resulting water-based ink to not less than 30% by mass and not more than 65% by mass.

(Contents of Respective Components in Water-Based Ink)

The content of the pigment in the water-based ink is preferably not less than 1.0% by mass, more preferably not less than 2.0% by mass and even more preferably not less than 2.5% by mass from the viewpoint of enhancing optical density of the water-based ink upon printing. In addition, the content of the pigment in the water-based ink is also preferably not more than 15.0% by mass, more preferably not more than 10.0% by mass and even more preferably not more than 7.0% by mass from the viewpoint of reducing viscosity of the water-based ink upon evaporation of the solvent therefrom as well as from the viewpoint of improving storage stability and ejection stability of the water-based ink.

The content of the polymer in the water-based ink is preferably not less than 0.5% by mass, more preferably not less than 0.8% by mass and even more preferably not less than 1.0% by mass, and is also preferably not more than 6.0% by mass, more preferably not more than 4.0% by mass and even more preferably not more than 3.0% by mass, from the viewpoint of improving storage stability and ejection stability of the water-based ink.

The mass ratio of the pigment to the pigment-containing crosslinked polymer particles [pigment/pigment-containing crosslinked polymer particles] is preferably not less than 100/300, more preferably not less than 100/200 and even more preferably not less than 100/150, and is also preferably not more than 100/25, more preferably not more than 100/50 and even more preferably not more than 100/70, from the viewpoint of enhancing optical density of the water-based ink upon printing.

The content of the pigment-containing crosslinked polymer particles in the water-based ink is preferably not less than 1% by mass, more preferably not less than 3% by mass and even more preferably not less than 4% by mass from the viewpoint of enhancing optical density of the water-based ink upon printing, and is also preferably not more than 20% by mass, more preferably not more than 10% by mass and even more preferably not more than 8% by mass from the viewpoint of improving storage stability and ejection stability of the water-based ink.

The content of the organic solvent in the water-based ink is not less than 30% by mass and not more than 65% by mass. From the viewpoint of improving ejection stability of the water-based ink, the content of the organic solvent in the water-based ink is preferably not less than 35% by mass and more preferably not less than 40% by mass, and is also preferably not more than 60% by mass and more preferably not more than 55% by mass.

The content of water in the water-based ink is preferably not less than 20% by mass, more preferably not less than 30% by mass and even more preferably not less than 40% by mass from the viewpoint of suitably exhibiting the advantageous effects of the present invention, and is also preferably not more than 65% by mass and more preferably not more than 60% by mass from the viewpoint of improving ejection stability of the water-based ink.

(Other Components)

The water-based ink of the present invention may also contain, in addition to the aforementioned components, various additives that may be usually used in water-based inks, such as a humectant, a wetting agent, a wetting penetrant, a surfactant, a dispersant, a viscosity controller, a defoaming agent, an antiseptic agent, a mildew-proof agent, a rust preventive and the like. For example, the water-based ink of the present invention may be compounded with an organic solvent such as a polyether-modified silicone, an acetylene glycol and an alkyleneoxy (such as ethyleneoxy and propyleneoxy) adduct of the acetylene glycol, etc.

As the wetting penetrant and the surfactant, preferred is a silicone-based surfactant, and particularly preferred is a polyether-modified silicone-based surfactant.

The polyether-modified silicone-based surfactant has such a structure that a hydrocarbon group bonded to a side chain and/or a terminal end of a silicone oil is substituted with a polyether group. Examples of the suitable polyether group include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

Specific examples of the polyether-modified silicone-based surfactant include "KF" series products such as "KF-353", "KF-355A" and "KF-642" all available from Shin-Etsu Chemical Industry Co., Ltd., "SILFACE SAG005" available from Nissin Chemical Industry Co., Ltd., "FZ-2191" available from NUC Corporation, and "BYK-348" available from BYK Chemie Japan K.K., etc.

In the present invention, the aforementioned silicone-based surfactant may be used in combination with the other surfactants than the silicone-based surfactant. Among the other surfactants, from the viewpoint of improving applicability of the resulting water-based ink, preferred is a nonionic surfactant.

(Properties of Water-Based Ink)

The viscosity of the water-based ink as measured at 32° C. is preferably not less than 2.0 mPa·s, more preferably not less than 3.0 mPa·s, even more preferably not less than 4.5 mPa·s and further even more preferably not less than 5.0 mPa·s, and is also preferably not more than 12 mPa·s, more preferably not more than 9.0 mPa·s, even more preferably not more than 8.0 mPa·s and further even more preferably not more than 7.0 mPa·s, from the viewpoint of improving storage stability and ejection stability of the resulting water-based ink.

Meanwhile, the viscosity of the water-based ink at 32° C. may be measured by the method described in Examples below.

The pH value of the water-based ink is preferably not less than 7.0, more preferably not less than 8.0 and even more preferably not less than 8.5 from the viewpoint of improving storage stability and ejection stability of the resulting water-based ink, and is also preferably not more than 11.0, more preferably not more than 10.0 and even more preferably not more than 9.5 from the viewpoint of improving resistance of members to the water-based ink and suppressing skin irritation.

[Ink-Jet Printing Method]

The ink-jet printing method of the present invention includes the steps of loading the water-based ink of the present invention to a conventionally known ink-jet printing apparatus, and ejecting the water-based ink in the form of droplets of the ink onto a printing medium to form characters or images on the printing medium.

The ink-jet printing apparatus may be any of a continuous injection type (a charge-controlling type, a spray type, etc.), an on-demand type (a piezoelectric type, a thermal type, an electrostatic attraction type, etc.) and the like. Among these apparatuses, preferred is a piezoelectric type ink-jet printing apparatus.

Examples of the printing medium usable in the present invention include a high-water absorbing plain paper, and a low-water absorbing coated paper and a low-water absorbing film. Specific examples of the coated paper include a versatile glossy coated paper, a multi-color foam glossy coated paper, etc. Specific examples of the film include a polyester film, a polyvinyl chloride film, a polypropylene film, a polyethylene film, etc.

With respect to the aforementioned embodiments, the present invention further provides the following aspects relating to the water-based ink for ink-jet printing and the ink-jet printing method.

<1> A water-based ink for ink-jet printing containing crosslinked polymer particles containing a pigment having an indanthrone skeleton, an organic solvent and water, in which a crosslinking rate of the crosslinked polymer is not less than 10 mol % and not more than 90 mol %, and a content of the organic solvent in the water-based ink is not less than 30% by mass and not more than 65% by mass.

<2> The water-based ink for ink-jet printing according to the aspect <1>, wherein the pigment having an indanthrone skeleton is in the form of a compound represented by the following formula (1).

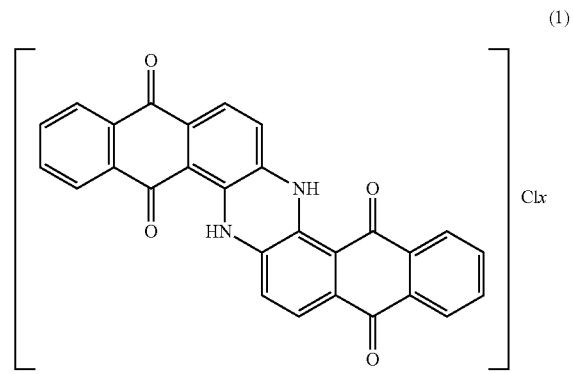

wherein Cl represents a chlorine atom that is substituted for any of hydrogen atoms present in a structure of the compound; and x is the number of chlorine atoms substituted and represents an integer of 0 to 3.

<3> The water-based ink for ink-jet printing according to the aspect <1> or <2>, wherein the pigment having an indanthrone skeleton is preferably at least one pigment selected from the group consisting of C.I. Pigment Blue 60, C.I.

Pigment Blue 22, C.I. Pigment Blue 64 and C.I. Pigment Blue 21, and more preferably C.I. Pigment Blue 60.

<4> The water-based ink according to any one of the aspects <1> to <3>, wherein the pigment having an indanthrone skeleton is contained in the water-based ink in the form of pigment-containing crosslinked polymer particles.

<5> The water-based ink according to any one of the aspects <1> to <4>, wherein the crosslinked polymer particles are obtained by dispersing the pigment with a polymer and then subjecting the polymer to crosslinking reaction with a crosslinking agent.

<6> The water-based ink according to any one of the aspects <1> to <5>, wherein a polymer constituting the crosslinked polymer particles is a vinyl-based polymer.

<7> The water-based ink according to any one of the aspects <1> to <6>, wherein the vinyl-based polymer preferably contains one or more constitutional units selected from the group consisting of a constitutional unit derived from (a) an ionic monomer, a constitutional unit derived from (b) a hydrophobic monomer and a constitutional unit derived from (c) a hydrophilic nonionic monomer, more preferably two or more constitutional units selected from the group consisting of the aforementioned three constitutional units, and even more preferably all of the aforementioned three constitutional units.

<8> The water-based ink according to any one of the aspects <1> to <7>, wherein a content of the constitutional unit derived from the ionic monomer (a) in the polymer constituting the crosslinked polymer particles is preferably not less than 3% by mass, more preferably not less than 5% by mass and even more preferably not less than 8% by mass, and is also preferably not more than 60% by mass, more preferably not more than 50% by mass and even more preferably not more than 40% by mass.

<9> The water-based ink according to any one of the aspects <1> to <8>, wherein a content of the constitutional unit derived from the hydrophobic monomer (b) in the polymer constituting the crosslinked polymer particles is preferably not less than 20% by mass, more preferably not less than 40% by mass and even more preferably not less than 50% by mass, and is also preferably not more than 90% by mass, more preferably not more than 80% by mass and even more preferably not more than 75% by mass.

<10> The water-based ink according to any one of the aspects <1> to <9>, wherein a content of the constitutional unit derived from the hydrophilic nonionic monomer (c) in the polymer constituting the crosslinked polymer particles is preferably not less than 5% by mass, more preferably not less than 10% by mass and even more preferably not less than 20% by mass, and is also preferably not more than 60% by mass, more preferably not more than 55% by mass and even more preferably not more than 50% by mass.

<11> The water-based ink according to any one of the aspects <7> to <10>, wherein in the case where a macromonomer is included as the component (b), a content of the macromonomer is preferably not less than 5% by mass, more preferably not less than 8% by mass and even more preferably not less than 10% by mass, and is also preferably not more than 50% by mass, more preferably not more than 40% by mass and even more preferably not more than 30% by mass.

<12> The water-based ink according to any one of the aspects <1> to <11>, wherein a weight-average molecular weight of the polymer before being crosslinked which constitutes the crosslinked polymer particles is preferably not less than 8,000, more preferably not less than 10,000, even more preferably not less than 11,000 and further even more preferably not more than 12,000, and is also preferably not more than 500,000, more preferably not more than 400,000, even more preferably not more than 300,000, further even more preferably not more than 200,000, still further even more preferably not more than 100,000 and furthermore preferably not more than 50,000.

<13> The water-based ink according to any one of the aspects <1> to <12>, wherein the pigment-containing crosslinked polymer particles are produced in the form of a pigment water dispersion thereof by a process including the following steps I and II:

Step I: subjecting a mixture containing a solution of the polymer before being crosslinked, the pigment and water (hereinafter also referred to merely as a "pigment mixture") to dispersion treatment to obtain an aqueous dispersion liquid of pigment-containing polymer particles; and Step II: mixing the aqueous dispersion liquid obtained in the step I with a crosslinking agent to subject the polymer to crosslinking treatment, thereby obtaining a pigment water dispersion.

<14> The water-based ink according to any one of the aspects <5> to <13>, wherein the crosslinking agent is preferably at least one compound selected from the group consisting of a compound containing two or more epoxy groups in a molecule thereof, a compound containing two or more oxazoline groups in a molecule thereof and a compound containing two or more isocyanate groups in a molecule thereof, and more preferably a compound containing two or more epoxy groups in a molecule thereof.

<15> The water-based ink according to any one of the aspects <1> to <14>, wherein a crosslinking rate (mol %) of the crosslinked polymer as calculated according to the following calculation formula (1) is preferably not less than 15 mol % and more preferably not less than 20 mol %, and is also preferably not more than 80 mol % and more preferably not more than 75 mol %:

$$\text{Crosslinking rate (mol \%)}=[(\text{number of moles of reactive groups in crosslinking agent})/(\text{number of moles of reactive groups in polymer which are capable of reacting with crosslinking agent})]\times 100 \quad (1)$$

wherein the "number of moles of reactive groups in crosslinking agent" is a value obtained by multiplying the number of moles of the crosslinking agent used by the number of the reactive groups contained in a molecule of the crosslinking agent.

<16> The water-based ink according to any one of the aspects <1> to <15>, wherein an acid value of the crosslinked polymer is preferably not less than 40 mgKOH/g, more preferably not less than 50 mgKOH/g, even more preferably not less than 60 mgKOH/g, further even more preferably not less than 70 mgKOH/g and still further even more preferably not less than 80 mgKOH/g, and is also preferably not more than 160 mgKOH/g, more preferably not more than 150 mgKOH/g, even more preferably not more than 145 mgKOH/g and further even more preferably not more than 120 mgKOH/g.

<17> The water-based ink according to any one of the aspects <1> to <16>, wherein an average particle size of the crosslinked polymer particles is preferably not less than 40 nm, more preferably not less than 60 nm, even more preferably not less than 80 nm and further even more preferably not less than 90 nm, and is also preferably not more than 150 nm, more preferably not more than 140 nm, even more preferably not more than 130 nm and further even more preferably not more than 120 nm.

<18> The water-based ink according to any one of the aspects <1> to <17>, wherein a boiling point of the organic solvent is preferably not lower than 90° C., more preferably not lower than 130° C., even more preferably not lower than 140° C. and further even more preferably not lower than 150° C., and is also preferably not higher than 245° C., more preferably not higher than 240° C. and even more preferably not higher than 235° C.

<19> The water-based ink according to any one of the aspects <1> to <18>, wherein the organic solvent is preferably a polyhydric alcohol, and more preferably a compound formed by bonding two or more hydroxy groups to a hydrocarbon having not less than 2 and not more than 6 carbon atoms, and a compound formed by condensing the two or more hydroxy groups bonded to the hydrocarbon, with each other.

<20> The water-based ink according to the aspect <19>, wherein the polyhydric alcohol is preferably at least one compound selected from the group consisting of alkanediols having not less than 2 and not more than 6 carbon atoms such as propylene glycol, diethylene glycol and 1,2 hexanediol, and polypropylene glycols having a molecular weight of not less than 500 and not more than 1000, more preferably at least one compound selected from the group consisting of 1,2-alkanediols having not less than 3 and not more than 4 carbon atoms such as propylene glycol and diethylene glycol, and the aforementioned polypropylene glycols, and even more preferably propylene glycol.

<21> The water-based ink according to any one of the aspects <1> to <20>, wherein a content of the pigment in the water-based ink is preferably not less than 1.0% by mass, more preferably not less than 2.0% by mass and even more preferably not less than 2.5% by mass, and is also preferably not more than 15.0% by mass, more preferably not more than 10.0% by mass and even more preferably not more than 7.0% by mass.

<22> The water-based ink according to any one of the aspects <1> to <21>, wherein a content of the polymer in the water-based ink is preferably not less than 0.5% by mass, more preferably not less than 0.8% by mass and even more preferably not less than 1.0% by mass, and is also preferably not more than 6.0% by mass, more preferably not more than 4.0% by mass and even more preferably not more than 3.0% by mass.

<23> The water-based ink according to any one of the aspects <1> to <22>, wherein a mass ratio of the pigment to the pigment-containing crosslinked polymer particles [pigment/pigment-containing crosslinked polymer particles] is preferably not less than 100/300, more preferably not less than 100/200 and even more preferably not less than 100/150, and is also preferably not more than 100/25, more preferably not more than 100/50 and even more preferably not more than 100/70.

<24> The water-based ink according to any one of the aspects <1> to <23>, wherein a content of the pigment-containing crosslinked polymer particles in the water-based ink is preferably not less than 1% by mass, more preferably not less than 3% by mass and even more preferably not less than 4% by mass, and is also preferably not more than 20% by mass, more preferably not more than 10% by mass and even more preferably not more than 8% by mass.

<25> The water-based ink according to any one of the aspects <1> to <24>, wherein a content of the organic solvent in the water-based ink is preferably not less than 35% by mass and more preferably not less than 40% by mass, and is also preferably not more than 60% by mass and more preferably not more than 55% by mass.

<26> The water-based ink according to any one of the aspects <1> to <25>, wherein a content of water in the water-based ink is preferably not less than 20% by mass, more preferably not less than 30% by mass and even more preferably not less than 40% by mass, and is also preferably not more than 65% by mass and more preferably not more than 60% by mass.

<27> The water-based ink according to any one of the aspects <1> to <26>, wherein a viscosity of the water-based ink as measured at 32° C. is preferably not less than 2.0 mPa·s, more preferably not less than 3.0 mPa·s, even more preferably not less than 4.5 mPa·s and further even more preferably not less than 5.0 mPa·s, and is also preferably not more than 12 mPa·s, more preferably not more than 9.0 mPa·s, even more preferably not more than 8.0 mPa·s and further even more preferably not more than 7.0 mPa·s.

<28> An ink-jet printing method including the steps of loading the water-based ink according to any one of the aspects <1> to <27> to an ink-jet printing apparatus, and ejecting the water-based ink in the form of droplets of the ink onto a printing medium to form characters or images on the printing medium.

EXAMPLES

In the following Production Examples, Examples, Comparative Example and Reference Examples, the "part(s)" and "%" indicate "part(s) by mass" and "% by mass", respectively, unless otherwise specified.

(1) Measurement of Weight-Average Molecular Weight of Polymer

The weight-average molecular weight of the polymer was measured by gel chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid and lithium bromide in N,N-dimethyl formamide such that concentrations of phosphoric acid and lithium bromide in the resulting solution were 60 mmol/L and 50 mmol/L, respectively, as an eluent, and using monodisperse polystyrenes having previously known molecular weights as a reference standard substance.

(2) Measurement of Average Particle Size of Pigment-Containing Crosslinked Polymer Particles The particles were subjected to cumulant analysis using a laser particle analyzing system "ELSZ-1000" available from Otsuka Electrics Co., Ltd., to measure an average particle size thereof. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was also conducted by adjusting a concentration of a dispersion to be measured to $5 \times 10^{-3}$% by mass in terms of a solid content thereof. The thus measured cumulant average particle size of the particles was defined as an average particle size of the pigment-containing crosslinked polymer particles.

(3) Measurement of Acid Value of Crosslinked Polymer

Two grams of the polymer before being crosslinked or 2 g of the pigment water dispersion obtained after the crosslinking reaction were diluted with 50 g of ion-exchanged water, and 3 mL of a 0.1 N sodium hydroxide solution was added to the resulting diluted solution. Then, 0.1 N hydrochloric acid was gradually added dropwise to the thus obtained mixed solution to measure two inflection points of a pH curve thereof. The number of moles of the acid as calculated from the difference between titers of the 0.1 N hydrochloric acid at the two inflection points corresponds to the number of moles of the carboxylic acid contained in the polymer. The thus measured number of moles of the acid was converted into the acid value (mgKOH/g).

(4) Measurement of Solid Content of Pigment Water Dispersion

Sodium sulfate dried to constant weight in a desiccator was weighed and charged in an amount of 10.0 g into a 30 mL polypropylene container (φ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(5) Viscosity of Ink

The viscosity of the ink was measured at 32° C. using an E-type viscometer "TV-25" (equipped with a standard cone rotor 1° 34'×R24; rotating speed: 50 rpm) available from Toki Sangyo Co., Ltd.

Production Examples 1 and 2 (Production of Water-Insoluble Polymers (a) and (b))

The monomers, solvent and chain transfer agent shown in the column "Initially Charged Monomer Solution" in Table 1 or 2 were charged into a reaction vessel equipped with two dropping funnels 1 and 2 and mixed with each other, and an inside atmosphere of the reaction vessel was replaced with nitrogen gas, thereby obtaining an initially charged monomer solution.

On the other hand, the monomers, solvent, polymerization initiator and chain transfer agent shown in the column "Dropping Monomer Solution 1" in Table 1 or 2 were mixed with each other to obtain a dropping monomer solution 1. The thus obtained dropping monomer solution 1 was charged into the dropping funnel 1, and an inside atmosphere of the dropping funnel 1 was replaced with nitrogen gas.

In addition, the monomers, solvent, polymerization initiator and chain transfer agent shown in the column "Dropping Monomer Solution 2" in Table 1 or 2 were mixed with each other to obtain a dropping monomer solution 2. The thus obtained dropping monomer solution 2 was charged into the dropping funnel 2, and an inside atmosphere of the dropping funnel 2 was replaced with nitrogen gas.

In a nitrogen atmosphere, the initially charged monomer solution in the reaction vessel was maintained at 77° C. while stirring, and the dropping monomer solution 1 in the dropping funnel 1 was gradually added dropwise to the reaction vessel over 3 hours. Next, the dropping monomer solution 2 in the dropping funnel 2 was gradually added dropwise to the reaction vessel over 2 hours. After completion of the dropwise addition, the obtained mixed solution in the reaction vessel was stirred at 77° C. for 0.5 hour. Then, a polymerization initiator solution prepared by dissolving 0.6 part of 2,2'-azobis(2,4-dimethylvaleronitrile) as a polymerization initiator "V-65" (tradename) available from FUJIFILM Wako Pure Chemical Corporation in 27.0 parts of methyl ethyl ketone was added to the mixed solution, and the resulting reaction solution was aged at 77° C. for 1 hour while stirring. The aforementioned procedure including the preparation and addition of the polymerization initiator solution and the aging of the reaction solution was repeated five more times. Then, while maintaining the reaction solution in the reaction vessel at 80° C. for 1 hour, methyl ethyl ketone was added thereto, thereby obtaining a solution of a water-insoluble polymer (a) (solid content: 40.8%).

The weight-average molecular weight of the thus obtained water-insoluble polymer (a) (Table 1) was 52,700, and the weight-average molecular weight of the thus obtained water-insoluble polymer (b) (Table 2) was 170,000.

Meanwhile, the details of the respective monomers shown in Tables 1 and 2 were as follows.

Styrene macromer: "AS-6 (S)" (active ingredient content: 50% by mass; number-average molecular weight: 6000) available from Toagosei Co., Ltd.

TM-40G: Methoxy polyethylene glycol monomethacrylate "NK ESTER TM-40G" (average molar number of addition of ethyleneoxide: 4; end group: methoxy group) available from Shin-Nakamura Chemical Co., Ltd.

PP-800: Polypropylene glycol monomethacrylate "BLEMMER PP-800" (average molar number of addition of propyleneoxide: 12; end group: hydroxy group) available from NOF Corporation.

43PAPE-600B: Polyethylene glycol/polypropylene glycol monomethacrylate "BLEMMER 43PAPE-600B" (tradename; average molar number of addition of ethyleneoxide: 6; average molar number of addition of propyleneoxide: 6; end group: phenyl group) available from NOF Corporation.

TABLE 1

| | Water-Insoluble Polymer (a) | | |
|---|---|---|---|
| | Initially charged monomer solution (part(s)) | Dropping monomer solution 1 (part(s)) | Dropping monomer solution 2 (part(s)) |
| (a) Ionic monomer | | | |
| Methacrylic acid | — | 51.2 | 12.8 |
| (b) Hydrophobic monomer | | | |
| Styrene | 17.6 | 140.8 | 17.6 |
| Styrene macromer | 12.0 | 108.0 | — |
| (c) Hydrophilic nonionic monomer | | | |
| TM-40G | 10.0 | 80.0 | 10.0 |
| Solvent | | | |
| Methyl ethyl ketone | 6.0 | 66.0 | 48.0 |
| Polymerization initiator | | | |
| V-65 | — | 3.2 | 0.8 |
| Chain transfer agent | | | |
| 2-Mercaptoethanol | 0.08 | 0.56 | 0.16 |

TABLE 2

Water-Insoluble Polymer (b)

| | Initially charged monomer solution (part(s)) | Dropping monomer solution 1 (part(s)) | Dropping monomer solution 2 (part(s)) |
|---|---|---|---|
| (a) Ionic monomer | | | |
| Methacrylic acid | — | 35.2 | 8.8 |
| (b) Hydrophobic monomer | | | |
| Styrene | 4.0 | 32.0 | 4.0 |
| Benzyl methacrylate | 15.9 | 127.3 | 15.9 |
| Styrene macromer | 8.0 | 72.0 | — |
| (c) Hydrophilic nonionic monomer | | | |
| PP-800 | 6.1 | 48.8 | 6.1 |
| 43PAPE-600B | 6.1 | 48.8 | 6.1 |
| Solvent | | | |
| Methyl ethyl ketone | 6.0 | 66.0 | 48.0 |
| Polymerization initiator | | | |
| V-65 | — | 3.2 | 0.8 |
| Chain transfer agent | | | |
| 2-Mercaptoethanol | 0.08 | 0.56 | 0.16 |

Example 1 (Production of Water-Based Ink 1)

(1) Production of Water Dispersion of Pigment-Containing Crosslinked Polymer Particles
(Step I)

One hundred sixty five parts by mass of C.I. Pigment Blue 60 (PB60) available from BASF were mixed with an aqueous solution of "JONCRYL 67" (J67; solid content: 15%; NaOH neutralization degree: 58 mol %; weight-average molecular weight: 12500; acid value: 213 mgKOH/g) as a polymer dispersant available from BASF in an amount of 55 parts by mass in terms of a solid content thereof. The resulting mixture was subjected to dispersion treatment using zirconia beads, thereby obtaining a pigment dispersion liquid A having a solid content of 22% in a whole solution thereof.
(Step II)

Twenty thousand parts of the resulting pigment dispersion liquid A were mixed with 7 parts of a 8N KOH aqueous solution, 215 parts of "DENACOL EX-321L" (trimethylolpropane polyglycidyl ether) as a crosslinking agent available from Nagase ChemteX Corporation and 628 parts of ion-exchanged water, and the resulting mixture was heated at 70° C. for 3 hours while stirring. After the heating, the obtained reaction solution was cooled to room temperature, and then subjected to filtration treatment through a filter "Minisart Syringe Filter" (pore size: 5 μm; material: cellulose acetate) available from Sartorius Inc., to remove coarse particles therefrom, thereby obtaining a pigment water dispersion B containing pigment-containing crosslinked polymer particles. The solid content of the thus obtained pigment water dispersion B was 22% by mass (pigment content: 15.7%; polymer content: 6.3%), and the average particle size of the pigment-containing crosslinked polymer particles was 114 nm.
(2) Production of Water-Based Ink Two hundred fifty four parts of the pigment water dispersion B, 460 parts of propylene glycol, 0.5 part of a polyether-modified silicone "SILFACE SAG005" as a wetting agent available from Nissin Chemical Co., Ltd., and 285 parts of ion-exchanged water were mixed with each other while stirring. The resulting mixed solution was subjected to filtration treatment through the aforementioned "Minisart Syringe Filter", thereby obtaining a water-based ink 1 having a viscosity of 5.8 mPa·s as measured at 32° C. and containing the pigment-containing crosslinked polymer particles having an average particle size of 109 nm. The results are shown in Table 3.

Example 2 (Production of Water-Based Ink 2)

(1) Production of Water Dispersion of Pigment-Containing Crosslinked Polymer Particles
(Step I)

One hundred fifty parts by mass of C.I. Pigment Blue 60 were mixed with an aqueous solution of "JONCRYL 690" (J690; a 100% ammonia-neutralized product; weight-average molecular weight: 16500; acid value: 240 mgKOH/g) as a polymer dispersant available from BASF in an amount of 45 parts by mass in terms of a solid content thereof. The resulting mixture was subjected to dispersion treatment using zirconia beads, thereby obtaining an aqueous pigment dispersion liquid C having a solid content of 19.5% in a whole solution thereof.
(Step II)

Twenty thousand parts of the resulting aqueous pigment dispersion liquid C were mixed with 219 parts of the aforementioned "DENACOL EX-321L" as a crosslinking agent available from Nagase ChemteX Corporation and 1,897 parts of ion-exchanged water, and the resulting mixture was heated at 70° C. for 3 hours while stirring. Then, the obtained reaction solution was subjected to filtration treatment in the same manner as in Example 1(1) to remove coarse particles therefrom, thereby obtaining a pigment water dispersion D containing pigment-containing crosslinked polymer particles. The solid content of the thus obtained pigment water dispersion D was 19% by mass (pigment content: 13.6%; polymer content: 5.4%), and the average particle size of the pigment-containing crosslinked polymer particles was 119 nm.
(2) Production of Water-Based Ink One hundred forty four parts of the pigment water dispersion D, 210 parts of propylene glycol, 0.3 part of the aforementioned "SILFACE SAG005" available from Nissin Chemical Co., Ltd., and 145 parts of ion-exchanged water were mixed with each other while stirring. Then, the resulting mixed solution was subjected to filtration treatment in the same manner as in Example 1(2), thereby obtaining a water-based ink 2.

Example 3 (Production of Water-Based Ink 3)

(1) Production of Water Dispersion of Pigment-Containing Crosslinked Polymer Particles Nine thousand parts of the aqueous pigment dispersion liquid C obtained in Example 2(1) were mixed with 160 parts of the aforementioned "DENACOL EX-321L" available from Nagase ChemteX Corporation and 1,153 parts of ion-exchanged water, and the resulting mixture was heated at 70° C. for 3 hours while stirring. Then, the obtained reaction solution was subjected to filtration treatment in the same manner as in Example 1(1) to remove coarse particles therefrom, thereby obtaining a pigment water dispersion E containing pigment-containing crosslinked polymer particles. The solid content of the thus obtained pigment water dispersion E was 19% by mass (pigment content: 13.6%;

polymer content: 5.4%), and the average particle size of the pigment-containing crosslinked polymer particles was 112 nm.

(2) Production of Water-Based Ink

One hundred forty nine parts of the pigment water dispersion E, 235 parts of propylene glycol, 0.3 part of the aforementioned "SILFACE SAG005" available from Nissin Chemical Co., Ltd., and 116 parts of ion-exchanged water were mixed with each other while stirring. Then, the resulting mixed solution was subjected to filtration treatment in the same manner as in Example 1(2), thereby obtaining a water-based ink 3.

Example 4 (Production of Water-Based Ink 4)

(1) Production of Water Dispersion of Pigment-Containing Crosslinked Polymer Particles
(Step I)

One hundred fifty parts by mass of C.I. Pigment Blue 60 were mixed with an aqueous solution of "JONCRYL 67" (J67; a 100% ammonia-neutralized product; weight-average molecular weight: 12500; acid value: 213 mgKOH/g) as a polymer dispersant available from BASF in an amount of 45 parts by mass in terms of a solid content thereof. The resulting mixture was subjected to dispersion treatment using zirconia beads, thereby obtaining an aqueous pigment dispersion liquid F having a solid content of 19.5% in a whole solution thereof.
(Step II)

Nine thousand parts of the resulting aqueous pigment dispersion liquid F were mixed with 86 parts of the aforementioned "DENACOL EX-321L" available from Nagase ChemteX Corporation and 664 parts of ion-exchanged water, and the resulting mixture was heated at 70° C. for 3 hours while stirring. Then, the obtained reaction solution was subjected to filtration treatment in the same manner as in Example 1(1) to remove coarse particles therefrom, thereby obtaining a pigment water dispersion G containing pigment-containing crosslinked polymer particles. The solid content of the thus obtained pigment water dispersion G was 19% by mass (pigment content: 13.6%; polymer content: 5.4%), and the average particle size of the pigment-containing crosslinked polymer particles was 119 nm.

(2) Production of Water-Based Ink

One hundred fifteen parts of the pigment water dispersion G, 184 parts of propylene glycol, 0.2 part of the aforementioned "SILFACE SAG005" available from Nissin Chemical Co., Ltd., and 101 parts of ion-exchanged water were mixed with each other while stirring. Then, the resulting mixed solution was subjected to filtration treatment in the same manner as in Example 1(2), thereby obtaining a water-based ink 4.

Example 5 (Production of Water-Based Ink 5)

(1) Production of Water Dispersion of Pigment-Containing Crosslinked Polymer Particles
(Step I)

A pigment paste prepared from C.I. Pigment Blue 60, the aforementioned "JONCRYL 67" (weight-average molecular weight: 12500; acid value: 213 mgKOH/g) available from BASF, sodium hydroxide and water was further mixed with an aqueous solution of the aforementioned "JONCRYL 67" (J67; solid content: 20%; NaOH neutralization degree: 40 mol %; weight-average molecular weight: 12500; acid value: 213 mgKOH/g), and the resulting mixture was mixed with a sodium hydroxide aqueous solution and a potassium hydroxide aqueous solution such that the neutralization degree of the obtained mixed solution was adjusted as shown in Table 3. Then, the resulting mixed solution was subjected to dispersion treatment using a high-pressure homogenizer, thereby obtaining an aqueous pigment dispersion liquid H having a solid content of 23.1% in a whole solution thereof and a mass ratio of the pigment to the polymer (pigment/polymer) of 71.4/28.6.
(Step II)

Two thousand parts of the resulting aqueous pigment dispersion liquid H were mixed with 32 parts of the aforementioned "DENACOL EX-321L" available from Nagase ChemteX Corporation and 203 parts of ion-exchanged water, and the resulting mixture was heated at 70° C. for 3 hours while stirring. Then, the obtained reaction solution was subjected to filtration treatment in the same manner as in Example 1(1) to remove coarse particles therefrom, thereby obtaining a pigment water dispersion I of pigment-containing crosslinked polymer particles. The solid content of the thus obtained pigment water dispersion I was 22% by mass (pigment content: 14.7%; polymer content: 7.3%), and the average particle size of the pigment-containing crosslinked polymer particles was 98 nm.

(2) Production of Water-Based Ink

One hundred nine parts of the pigment water dispersion I, 188 parts of propylene glycol, 0.2 part of the aforementioned "SILFACE SAG005" available from Nissin Chemical Co., Ltd., and 103 parts of ion-exchanged water were mixed with each other while stirring. Then, the resulting mixed solution was subjected to filtration treatment in the same manner as in Example 1(2), thereby obtaining a water-based ink 5.

Examples 6 to 9 (Production of Water-Based Inks 6 to 9)

The same procedure as in Example 5 was repeated except that upon production of the water-based ink in Example 5(2), the amount of the propylene glycol used was changed to 168 part, and 20 parts of the organic solvent shown in Table 3 were additionally added, thereby obtaining water-based inks 6 to 9 of pigment-containing crosslinked polymer particles. The results are shown in Table 3.

Example 10 (Production of Water-Based Ink 10)

(1) Production of Water Dispersion of Pigment-Containing Crosslinked Polymer Particles
(Step I)

A pigment paste prepared from C.I. Pigment Blue 60 and the aqueous dispersion liquid of the water-insoluble polymer (a) obtained in Production Example 1 (solid content: 15%; NaOH neutralization degree: 73 mol %; weight-average molecular weight: 52,700; acid value: 104 mgKOH/g) was further mixed with the aforementioned aqueous dispersion liquid of the water-insoluble polymer (a). The resulting mixed solution was subjected to dispersion treatment using a high-pressure homogenizer, thereby an aqueous pigment dispersion liquid J having a solid content of 23.7% in a whole solution thereof and a mass ratio of the pigment to the polymer (pigment/polymer) of 70/30.
(Step II)

Two thousand parts of the resulting aqueous pigment dispersion liquid J were mixed with 10.2 parts of the aforementioned "DENACOL EX-321L" available from Nagase ChemteX Corporation and 189.0 parts of ion-exchanged water, and the resulting mixture was heated at 70° C. for 3 hours while stirring. Then, the obtained reaction solution was subjected to filtration treatment in the same manner as in Example 1(1) to remove coarse particles therefrom, thereby obtaining a pigment water dispersion K of pigment-containing crosslinked polymer particles. The solid content of the thus obtained pigment water dispersion K was 22% by mass (pigment content: 15.1%; polymer content: 6.9%), and the average particle size of the pigment-containing crosslinked polymer particles was 110 nm.

(2) Production of Water-Based Ink

One hundred nine parts of the pigment water dispersion K, 180 parts of propylene glycol, 0.2 part of the aforementioned "SILFACE SAG005" available from Nissin Chemical Co., Ltd., and 111 parts of ion-exchanged water were mixed with each other while stirring. Then, the resulting mixed solution was subjected to filtration treatment in the same manner as in Example 1(2), thereby obtaining a water-based ink 10. The results are shown in Table 3.

Example 11 (Production of Water-Based Ink 11)

(1) Production of Water Dispersion of Pigment-Containing Crosslinked Polymer Particles
(Step I)

A pigment paste prepared from C.I. Pigment Blue 60 and the aqueous dispersion liquid of the water-insoluble polymer (b) obtained in Production Example 2 (solid content: 15%; NaOH neutralization degree: 73 mol %; weight-average molecular weight: 170,000; acid value: 72 mgKOH/g) was further mixed with the aforementioned aqueous dispersion liquid of the water-insoluble polymer (b). The resulting mixed solution was subjected to dispersion treatment using a high-pressure homogenizer, thereby an aqueous pigment dispersion liquid L having a solid content of 22.0% in a whole solution thereof and a mass ratio of the pigment to the polymer (pigment/polymer) of 70/30.
(Step II)

Two thousand parts of the resulting aqueous pigment dispersion liquid L were mixed with 6.5 parts of the aforementioned "DENACOL EX-321L" available from Nagase ChemteX Corporation and 122.7 parts of ion-exchanged water, and the resulting mixture was heated at 70° C. for 3 hours while stirring. Then, the obtained reaction solution was subjected to filtration treatment in the same manner as in Example 1(1) to remove coarse particles therefrom, thereby obtaining a pigment water dispersion M of pigment-containing crosslinked polymer particles. The solid content of the thus obtained pigment water dispersion M was 22% by mass (pigment content: 15.2%; polymer content: 6.8%), and the average particle size of the pigment-containing crosslinked polymer particles was 126 nm.

(2) Production of Water-Based Ink

One hundred nine parts of the pigment water dispersion M, 180 parts of propylene glycol, 0.2 part of the aforementioned "SILFACE SAG005" available from Nissin Chemical Co., Ltd., and 111 parts of ion-exchanged water were mixed with each other while stirring. Then, the resulting mixed solution was subjected to filtration treatment in the same manner as in Example 1(2), thereby obtaining a water-based ink 11. The results are shown in Table 3.

Comparative Example 1 (Production of Water-Based Ink 12)

One hundred thirty seven parts of the aqueous pigment dispersion liquid C obtained in the step I of Example 2(1), 195 parts of propylene glycol, 0.3 part of the aforementioned "SILFACE SAG005" available from Nissin Chemical Co., Ltd., and 168 parts of ion-exchanged water were mixed with each other while stirring. Then, the resulting mixed solution was subjected to filtration treatment in the same manner as in Example 1(2), thereby obtaining a water-based ink 12.

Reference Example 1 (Production of Water-Based Ink 13)

The same procedure as in Comparative Example 1 was repeated except that the pigment used in the aqueous pigment dispersion liquid C was replaced with C.I. Pigment Orange 34 (PO34) having no indanthrone skeleton, and the amounts of propylene glycol and ion-exchanged water used upon (2) production of the water-based ink were changed to 200 parts and 153 parts, respectively, thereby obtaining a water-based ink 13.

Reference Example 2 (Production of Water-Based Ink 14)

The same procedure as in Comparative Example 1 was repeated except that the pigment used in the aqueous pigment dispersion liquid C was replaced with C.I. Pigment Green 36 (PG36) having no indanthrone skeleton, and the amounts of propylene glycol and ion-exchanged water used upon (2) production of the water-based ink were changed to 215 parts and 138 parts, respectively, thereby obtaining a water-based ink 14.

Reference Example 3 (Production of Water-Based Ink 15)

The same procedure as in Comparative Example 1 was repeated except that the pigment used in the aqueous pigment dispersion liquid C was replaced with C.I. Pigment Blue 15:6 (PB15:6) having no indanthrone skeleton, and the amounts of propylene glycol and ion-exchanged water used upon (2) production of the water-based ink were changed to 220 parts and 117 parts, respectively, thereby obtaining a water-based ink 15.

Reference Example 4

The aqueous pigment dispersion liquid C obtained in Example 2 was used as a water-based ink containing no organic solvent.

TABLE 3

| | | | Examples | | | | | | | |
|---|---|---|---|---|---|---|---|---|---|---|
| | | | 1 | 2 | 3 | 4 | 5 | 6 | 7 | 8 |
| Kind of pigment | | | PB60 | PB60 | PB60 | PB60 | PB60 | PB60 | PB60 | PB60 |
| Crosslinked polymer | Kind of polymer before being crosslinked | | J67 | J690 | J690 | J67 | J67 | J67 | J67 | J67 |
| | Neutralizing Conditions | Kind of neutralizing agent** | NaOH (58%) KOH1% | NH₃ (100%) — | NH₃ (100%) — | NH₃ (100%) — | NaOH (49%) KOH1% | NaOH (49%) KOH1% | NaOH (49%) KOH1% | NaOH (49%) KOH1% |

TABLE 3-continued

| | | EX-321L | EX-321L | EX-321L | EX-321L | EX-321L | EX-321L | EX-321L | EX-321L |
|---|---|---|---|---|---|---|---|---|---|
| Crosslinking conditions | Kind of crosslinking agent | | | | | | | | |
| | Crosslinking rate (mol %) | 40 | 40 | 70 | 40 | 50 | 50 | 50 | 50 |
| Acid value of crosslinked polymer (mgKOH/g) | | 128 | 144 | 72 | 128 | 107 | 107 | 107 | 107 |

| | | Examples | | | | | | | |
|---|---|---|---|---|---|---|---|---|---|
| | | 1 | 2 | 3 | 4 | 5 | 6 | 7 | 8 |
| Kind of water-based ink | | 1 | 2 | 3 | 4 | 5 | 6 | 7 | 8 |
| Composition of ink (%) | Content of pigment (%) | 4 | 4 | 4 | 4 | 4 | 4 | 4 | 4 |
| | Organic solvent (%) Propylene glycol | 46 | 42 | 47 | 46 | 47 | 42 | 42 | 42 |
| | Diethylene glycol | — | — | — | — | — | 5 | — | — |
| | DEGME*¹ | — | — | — | — | — | — | 5 | — |
| | Glycerin | — | — | — | — | — | — | — | 5 |
| | 2-Pyrrolidone | — | — | — | — | — | — | — | — |
| | Wetting agent: SAG005 (%) | 0.05 | 0.05 | 0.05 | 0.05 | 0.05 | 0.05 | 0.05 | 0.05 |
| | Ion-exchanged water | Balance | Balance | Balance | Balance | Balance | Balance | Balance | Balance |
| Results | Viscosity at 32° C. (mPa·s) | 5.8 | 5.0 | 5.2 | 5.7 | 5.5 | 5.4 | 5.3 | 5.6 |
| | Average particle size (nm) | 109 | 118 | 110 | 121 | 100 | 103 | 101 | 102 |
| | Ejection properties | Good | Good | Good | Good | Good | Good | Good | Good |

| | | Examples | | | | Reference Examples | | | |
|---|---|---|---|---|---|---|---|---|---|
| | | 9 | 10 | 11 | Com. Ex. 1 | 1 | 2 | 3 | 4 |
| Kind of pigment | | PB60 | PB60 | PB60 | PB60 | PO34 | PG36 | PB15:6 | PB60 |
| Crosslinked polymer | Kind of polymer before being crosslinked | J67 | Polymer (a) | Polymer (b) | J690 | J690 | J690 | J690 | J690 |
| | Neutralizing Conditions Kind of neutralizing agent** | NaOH (49%) KOH1% | NaOH (73%) — | NaOH (73%) — | NH₃ (100%) — | NH₃ (100%) — | NH₃ (100%) — | NH₃ (100%) — | NH₃ (100%) — |
| | Crosslinking conditions Kind of crosslinking agent | EX-321L | EX-321L | EX-321L | — | — | — | — | — |
| | Crosslinking rate (mol %) | 50 | 30 | 30 | — | — | — | — | — |
| | Acid value of crosslinked polymer (mgKOH/g) | 107 | 73 | 50 | 240 | 240 | 240 | 240 | 240 |

| | | Examples | | | | Reference Examples | | | |
|---|---|---|---|---|---|---|---|---|---|
| | | 9 | 10 | 11 | Com. Ex. 1 | 1 | 2 | 3 | 4 |
| Kind of water-based ink | | 9 | 10 | 11 | 12 | 13 | 14 | 15 | — |
| Composition of ink (%) | Content of pigment (%) | 4 | 4 | 4 | 4 | 4 | 4 | 4 | 15 |
| | Organic solvent (%) Propylene glycol | 42 | 45 | 45 | 39 | 42 | 45 | 46 | — |
| | Diethylene glycol | — | — | — | — | — | — | — | — |
| | DEGME*¹ | — | — | — | — | — | — | — | — |
| | Glycerin | — | — | — | — | — | — | — | — |
| | 2-Pyrrolidone | 5 | — | — | — | — | — | — | — |
| | Wetting agent: SAG005 (%) | 0.05 | 0.05 | 0.05 | 0.05 | 0.05 | 0.05 | 0.05 | — |
| | Ion-exchanged water | Balance | Balance | Balance | Balance | Balance | Balance | Balance | Balance |
| Results | Viscosity at 32° C. (mPa·s) | 5.5 | 5.9 | 5.9 | 27.2 | 5.3 | 5.5 | 5.7 | 5.0 |
| | Average particle size (nm) | 103 | 111 | 126 | 329 | 106 | 122 | 127 | 128 |
| | Ejection properties | Good | Good | Good | Not ejectable | Good | Good | Good | Good |

Note:
**The value shown in the parenthesis represents a neutralization degree of the polymer.
Note:
*¹DEGME: Diethylene glycol monomethyl ether
Note:
**The value shown in the parenthesis represents a neutralization degree of the polymer.
Note:
*¹DEGME: Diethylene glycol monomethyl ether The inks produced in Examples 1 to 11, Comparative Example 1 and Reference Examples 1 to 4 were respectively stored at room temperature (32° C.) for one week, and then subjected to measurement of viscosity and average particle size of particles therein to determine storage stability of the respective inks.

From Table 3, when comparing the water-based inks obtained in Examples 1 to 11 and the water-based ink obtained in Reference Example 4 with the water-based ink obtained in Comparative Example 1, it was confirmed that the water-based ink obtained in Comparative Example 1 (using the polymer having no crosslinked structure) suffered from considerable increase in viscosity and flocculation thereof.

In addition, as a result of evaluating ejection properties of the resulting water-based inks using an ink-jet printer "IPSiO SG2010L" available from Ricoh Co., Ltd., it was confirmed that although the water-based inks obtained in Examples 1 to 11 exhibited good ejection properties, the water-based ink obtained in Comparative Example 1 was not ejectable.

On the other hand, when comparing the water-based inks obtained in Reference Examples 1 to 3 (using the pigment having no indanthrone skeleton) with the water-based inks obtained in Examples 1 to 11, it was conformed that in the case where the organic solvent was contained in an amount of not less than 30% by mass and not more than 65% by mass, such a phenomenon that the water-based inks were incapable of ensuring good storage stability when using the polymer having no crosslinked structure therein is peculiar to those inks containing the pigment having an indanthrone skeleton. Furthermore, from the results concerning the water-based ink obtained in Reference Example 4, it was confirmed that the water-based ink containing no organic solvent was free of considerable increase in viscosity and flocculation thereof even though the ink contained the pigment having an indanthrone skeleton.

INDUSTRIAL APPLICABILITY

The water-based ink for ink-jet printing according to the present invention which contains a pigment having an indanthrone skeleton can be prevented from suffering from increase in viscosity and flocculation even when used in the form of a system containing a large amount of a solvent, and is therefore useful, in particular, as a water-based ink for ink-jet printing.

The invention claimed is:

1. A water-based ink for ink-jet printing comprising crosslinked polymer particles comprising a pigment having an indanthrone skeleton, an organic solvent and water, in which the crosslinked polymer particles are obtained by dispersing the pigment with a polymer and then subjecting the polymer to crosslinking reaction with a crosslinking agent, the polymer constituting the crosslinked polymer particles is a vinyl-based polymer, an acid value of the vinyl-based polymer before being crosslinked is not less than 150 mgKOH/g, a crosslinking rate of the crosslinked polymer is not less than 10 mol % and not more than 90 mol %, and a content of the organic solvent in the water-based ink is not less than 30% by mass and not more than 65% by mass.

2. The water-based ink for ink-jet printing according to claim 1, wherein the vinyl-based polymer is an acrylic polymer comprising a constitutional unit derived from acrylic acid and/or a constitutional unit derived from methacrylic acid.

3. The water-based ink for ink-jet printing according to claim 1, wherein an acid value of the crosslinked polymer is not less than 40 mgKOH/g and not more than 160 mgKOH/g.

4. The water-based ink for ink-jet printing according to claim 1, wherein the crosslinking agent is in the form of a compound comprising two or more epoxy groups in a molecule thereof.

5. The water-based ink for ink-jet printing according to claim 1, wherein the pigment-containing crosslinked polymer particles are produced in the form of a pigment water dispersion by a process comprising the following steps I and II:
Step I: subjecting a mixture comprising a solution of the polymer before being crosslinked, the pigment and water to dispersion treatment to obtain an aqueous dispersion liquid of pigment-containing polymer particles; and
Step II: mixing the aqueous dispersion liquid obtained in the step I with the crosslinking agent to subject the aqueous dispersion liquid to crosslinking treatment, thereby obtaining the pigment water dispersion.

6. The water-based ink for ink-jet printing according to claim 1, wherein the organic solvent comprises a polyhydric alcohol having a boiling point of not lower than 90° C. and not higher than 245° C.

7. The water-based ink for ink-jet printing according to claim 1, wherein the polyhydric alcohol is at least one compound selected from the group consisting of a compound formed by bonding two or more hydroxy groups to a hydrocarbon having not less than 2 and not more than 6 carbon atoms, and a compound formed by condensing the two or more hydroxy groups bonded to the hydrocarbon.

8. The water-based ink for ink-jet printing according to claim 1, wherein the pigment having an indanthrone skeleton is C.I. Pigment Blue 60.

9. The water-based ink for ink-jet printing according to claim 1, wherein a viscosity of the water-based ink as measured at 32° C. is not less than 2.0 mPa·s and not more than 12 mPa·s.

10. The water-based ink for ink-jet printing according to claim 1, wherein a mass ratio of the pigment to the pigment-containing crosslinked polymer particles [pigment/pigment-containing crosslinked polymer particles] is not less than 100/300 and not more than 100/25.

11. The water-based ink for ink-jet printing according to claim 1, wherein a content of the pigment-containing crosslinked polymer particles in the water-based ink is not less than 1% by mass and not more than 20% by mass.

12. An ink-jet printing method comprising the steps of loading the water-based ink according to claim 1 to an ink-jet printing apparatus, and ejecting the water-based ink in the form of droplets of the ink from the ink-jet printing apparatus onto a printing medium to form characters or images on the printing medium.

* * * * *